United States Patent [19]
Cronin

[11] 4,447,737
[45] May 8, 1984

[54] VARIABLE FREQUENCY INDUCTION GENERATOR

[75] Inventor: Michael J. Cronin, Sherman Oaks, Calif.

[73] Assignee: Lockheed Corporation, Burbank, Calif.

[21] Appl. No.: 457,836

[22] Filed: Jan. 14, 1983

Related U.S. Application Data

[63] Continuation of Ser. No. 220,371, Dec. 29, 1980, abandoned.

[51] Int. Cl.³ .......................................... H02K 21/48
[52] U.S. Cl. ........................................ 290/6; 322/47; 310/114
[58] Field of Search ............. 290/6; 322/47; 310/114, 310/126, 162, 165, 171, DIG. 4

[56] References Cited

U.S. PATENT DOCUMENTS

| | | | |
|---|---|---|---|
| 2,359,886 | 10/1944 | Wikkenhauser | 322/47 X |
| 3,200,324 | 8/1965 | Wagner | 322/47 X |
| 3,836,802 | 9/1974 | Parker | 310/DIG. 4 X |
| 4,074,160 | 2/1978 | Broadway | 310/162 X |
| 4,292,532 | 9/1981 | Leroux | 290/6 |
| 4,305,001 | 12/1981 | Vamaraju et al. | 290/6 X |

Primary Examiner—G. Z. Rubinson
Assistant Examiner—W. E. Duncanson, Jr.
Attorney, Agent, or Firm—Louis L. Dachs

[57] ABSTRACT

The invention is a combination induction generator/synchronous generator power system which finds particular use in aircraft environments. The power system includes an induction generator (36) and a tandem generator (38) enclosed in a single housing (34). The tandem generator (38) includes a tandem synchronous generator (46) which optionally excites the induction generator (36) or provides power to the aircraft systems upon activation of the three-phase contactor (48). The tandem generator (38) also includes a tandem synchronous generator (44) which produces, via a phase controlled rectifier bridge (42), 270 VDC power for the aircraft systems.

32 Claims, 5 Drawing Figures

VARIABLE FREQUENCY INDUCTION GENERATOR

This application is a continuation of application Ser. No. 220,371, filed Dec. 29, 1980, now abandoned.

TECHNICAL FIELD

The invention relates generally to a combination induction generator/permanent magnet generator, and more specifically to an induction generator/dual samarium-cobalt generator combination as a source of electrical power in aircraft.

BACKGROUND AND BACKGROUND ART

In modern aircraft power systems, as well as in other power systems, use is sometimes made of high-energy permanent magnet material; e.g., samarium-cobalt, in generators and motors. In the generator application, the permanent-magnet rotor exhibits no losses and it is an ideally-simple generator configuration. In addition, the three-phase stator-winding can be easily fluid-cooled.

The problems, however, with the above permanent magnet machine are that materials such as samarium cobalt are scarce, expensive, heavy, and present fabrication difficulties since the material is available primarily in small sections. A further and more serious problem is that the potential energy of the machine can self-destruct (electrically) if a stator short occurs. This is because the generator excitation, the permanent magnet field, cannot be shut off, other than by mechanically-isolating the drive-source from the generator.

On the other hand, squirrel-cage rotor induction generators are extremely rugged and reliable. Such generators use relatively inexpensive materials in the rotor and they can normally be easily fabricated. There are, however, also certain problems associated with induction generators. First, to operate as a generator, the rotor must be driven above its synchronous speed; i.e., in a negative-slip condition. Second, the machine cannot operate as a generator unless there is at least one synchronous generator available in the system to excite it. Finally, the machine cannot supply either its own excitation or (lagging) reactive kilovars.

It is a primary object then, of the present invention, to provide a power generation system, particularly for aircraft, that utilizes an extremely reliable induction machine as a power generator within the system.

It is a further object of the present invention, to develop a multi-machine power system which utilizes at least one synchronous machine in conjunction with an induction machine, all in a single housing.

These and other objects of the present invention will become more readily apparent after a full consideration of the following description of the instant invention and the several advantages thereof enumerated herein.

A variety of electric motors which utilize multiple rotors within a single motor housing are known in the prior art. In U.S. Pat. No. 3,743,873 to de Jong, for example, a synchronous electric machine, including two induction rotors supported by a single shaft, is disclosed. The arrangement of rotors is utilized to increase the useful flux and improve the synchronous electric machine.

In another type of machine, use of both permanent magnet rotors and induction rotors about a single shaft of a synchronous electric motor is disclosed. See U.S. Pat. Nos. 2,949,553 to Benoit, 3,209,185 to Draper, 3,521,097 to Trinter, and 3,973,137 to Drubina. All of these latter patents, to some degree or another, operate via induction start of a synchronous motor design.

In another prior art machine, disclosed in U.S. Pat. No. 907,176 to Richardson, two motors are mechanically coupled in parallel planes within a common magnetic frame. Such a dual motor arrangement is designed for heavy work where the motor must be started under heavy load.

Finally, U.S. Pat. No. 285,548 to Ball shows an arrangement wherein an "integral" exciter is utilized to excite a dynamo-electric machine. The arrangement provides, via a basic machine design, an efficient electric generator for incandescent lighting without the expense of a separate exciter.

All of the aforementioned prior art patents are directed to power systems quite different from the permanent-magnet-rotor excited induction-generator system of the present invention, and in fact, do not address themselves to problems relating to utilization and excitation of induction generators.

A slightly-more complex system which utilizes a synchronous generator as an exciter for an induction generator is disclosed in co-pending U.S. patent application, Ser. No. 220,865, for "A Differential Drive for Frequency Control of Induction Generators", assigned to the assignee herein. The system, hereby incorporated by reference herein, includes the capability of adjusting the slip frequency as a function of the load and the input speed. The instant invention is a somewhat simpler and more straight-forward system which utilizes a permanent magnet generator as an exciter for an induction generator wherein fixed ratio drives are utilized with the input power. While the system does not include the benefit of being able to adjust the slip frequency as a function of load and input speed, it does include other benefits. These benefits include, but are not limited to, a somewhat less complex drive arrangement, lower cost of drives, somewhat less complex starter systems when it is desired to use the induction generator as a motor starter, as might be the case in aircraft installations. The latter benefit is attributable to the fact that the induction generator is directly connected to the engine.

DISCLOSURE OF INVENTION

The induction-generator/dual permanent-magnet generator system of the present invention comprises a single machine having a central drive shaft gear-coupled to at least two distinct rotors. One rotor is an induction rotor while the other rotor is a permanent magnet rotor. Then at least two rotors are assembled along with various windings in two cylindrical cavities of a single housing. The housing may incorporate a common oil-cooling/oil lubrication circuit.

In a preferred embodiment, the induction rotor is a squirrel-cage rotor and the other rotor is a samarium-cobalt tandem rotor which includes two individual rotors separated by a non-magnetic material. Silicon-controlled-rectifiers may optionally be incorporated within the housing to rectify the ac output of one of the tandem samarium-cobalt rotors.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only and are not intended as a definition of the limits of the invention.

DESCRIPTION OF DRAWINGS

In the various drawing figures, like numerals denote like parts.

As stated hereinabove, it is a primary purpose of the present invention to provide a solution to the problem of how to use one of the most reliable machines known; i.e., an induction machine, as a generator. In order to accomplish this in accordance with the present invention, an exciter, whose speed is below that of the main or induction machine is provided. The induction machine, thus, thinks it is being driven at a higher speed than the supply frequency and operates in a generating mode. The present invention utilizes at least one synchronous or permanent magnet generator in combination with an induction machine. Constraining the permanent magnet generator to lower speed levels relative to the induction machine speed causes the induction machine to function as a generator.

Figure 1:
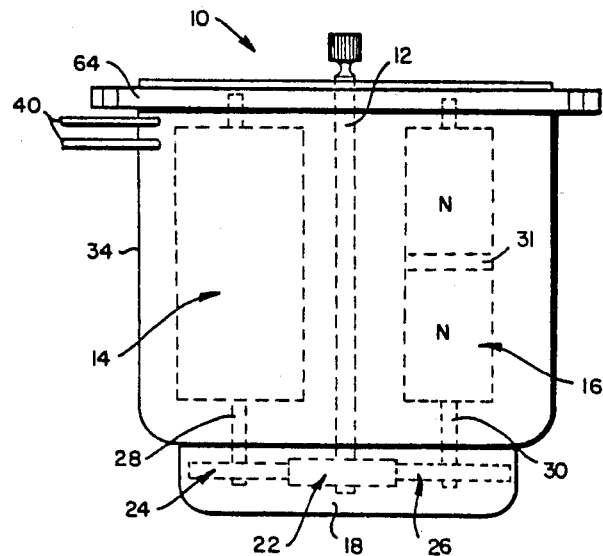
FIG. 1 is a schematic top view of a combination synchronous generator/induction generator power system in accordance with a first embodiment of the present invention.
Figure 2:
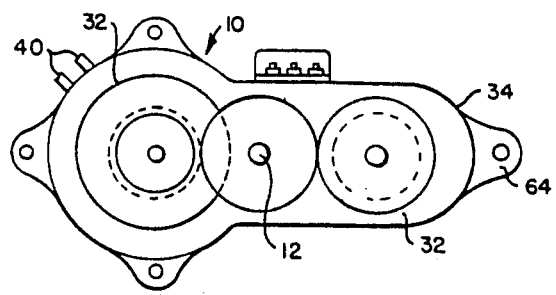
FIG. 2 is a schematic end view of the system of FIG. 1.

Referring now to FIGS. 1 and 2, there is shown therein schematic representations of a preferred embodiment combination induction-generator/synchronous-generator power system (10) in accordance with the present invention. In accordance with this embodiment, a central shaft (12), driven by a power source; e.g., an aircraft engine (not shown) is coupled to the induction rotor (14) and the synchronous or permanent magnet rotor (16) at the anti-drive end of the power system (10) via a spur-gear interface (18). The spur-gear interface (18) includes a central drive shaft gear (22) and two spur-gears (24) and (26) which are utilized to drive the induction rotor shaft (28) and synchronous rotor shaft (30), respectively.

In the preferred form of the instant invention, the induction rotor (14) is a squirrel-cage induction rotor and the synchronous generator rotor (16) is a permanent magnet tandem rotor that includes two rotors mounted on shaft (30) separated by non-magnetic material (31). A candidate permanent magnet material for the latter rotor would be samarium-cobalt.

The power system (10) thus becomes a three generator power system, the three rotor assemblies of which are enclosed in two cylindrical-cavity or tunnel areas (32) in a single housing (34). The three electrical machines; i.e., the induction generator (36) and the tandem generators (38) (FIG. 3) are therefore mechanically integrated into a single housing (34). The single housing (34) may incorporate a common oil-cooling/oil-lubrication circuit, as indicated by the cooling fluid couplings (40).

Figure 3:
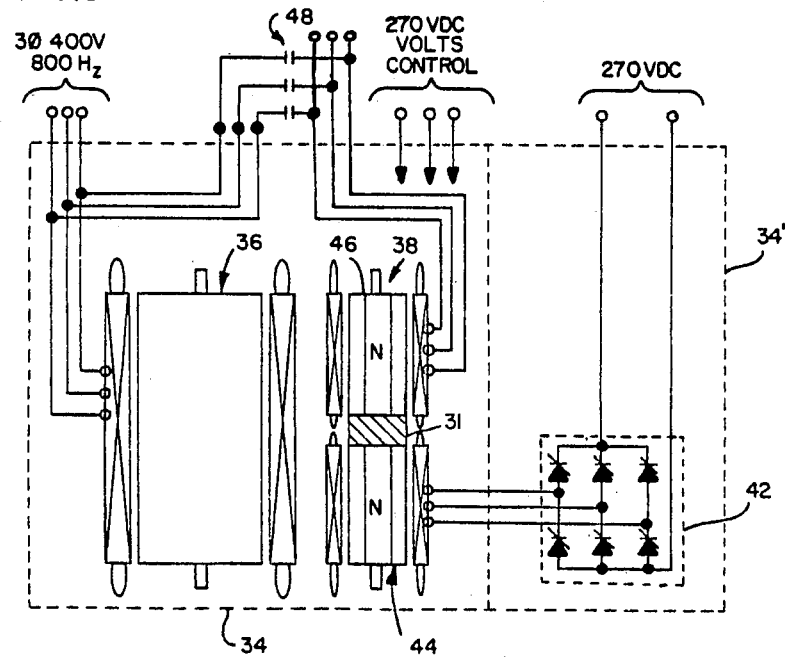
FIG. 3 is a schematic view of the stators and circuits of the embodiment of FIGS. 1 and 2, additionally showing a rectifier bridge alternatively operative with one of the synchronous generator stators.

The power system design of FIGS. 1-3 results in a unique, completely-brushless, generator-combination, utilizing a common housing (34). The housing (34) may be designed so as to optionally include a silicon-controlled-rectifier bridge (42), which is shown in FIG. 3 as positioned optionally either external to the housing (34), or within the housing (34). The three phase rectifier bridge (42), shown in FIG. 3, rectifies the ac output of the tandem synchronous generator (44) to 270 VDC, for purposes which will be described hereinbelow with respect to aircraft environment use.

It is evident from the foregoing that a unique combination of the three generators, shown schematically in FIGS. 1-3, fulfills the roles wherein one tandem synchronous-generator (46) can operate dually as an exciter for the induction generator (36), or to provide direct output power. The other tandem synchronous generator (44) may be used to power a three phase rectifier-bridge (42) to provide a constant 270 VDC output, over the typical 2-1 speed range, of an aircraft engine. Moreover, the induction generator (36) itself can also be used in two roles; namely, as an asynchronous generator and as a motor-starter for the aircraft's engines.

The gear arrangement in spur gear interface (18) insures that the induction rotor (14) runs at a higher speed relative to the exciter synchronous rotor (16), and the induction machine operates in a generating mode as an induction generator (36). This negative slip condition is brought about because the larger gear (26) is used to drive the synchronous rotor shaft (30) while a smaller gear (24) drives the induction rotor shaft (28). One advantage of such a drive system is that the power system (10) generator rotors are driven at the anti-drive end. By selecting the desired or correct gear ratio or pitch, the induction generators squirrel-cage rotor (14) can be simply driven at a speed in a range of about 5%–7% higher than the permanent magnet synchronous rotor (16). Thus, the squirrel-cage rotor (14) is driven at supersynchronous speed (negative slip) and, as a result, the induction machine runs as an induction-generator when the three-phase contactor (48) is closed.

There are several additional advantageous features of the induction-generator/synchronous generator power system (10) particularly when used in aircraft environments, as follows:

1. The induction generator (36) can be driven over a 2:1 (or more) speed range; over which range, the negative slip and constant stator flux is maintained without any servo-control, slaved to the input drive speed.

2. For relatively light loads, the small tandem synchronous generator (46), used to excite the induction generator (36), can be used to supply aircraft loads directly by changing the three-phase contactor (48) position. The other small tandem synchronous generator (44) supplying the phase-delayed rectifier bridge (42), provides the constant-voltage 270 VDC output required by other aircraft systems.

3. The voltage-to-frequency ratio of the induction generator (36) and the synchronous tandem generator (38) is constant, which is ideal for ac motors.

4. The selection of 800 $H_z$ power as shown in FIG. 3 permits the maximum speed of two pole motors to be increased to 48,000 rpm (over the 24,000 rpm of 400 $H_z$ motors). This decreases the weight and dimensions of the motors, and weight penalties in aircraft are to be assiduously avoided.

5. The preferred permanent magnet rotor synchronous-generator inherently produces a voltage proportional to speed (frequency); therefore, no special voltage regulation is required for the induction generator (36).

6. The higher frequency of operation of the FIG. 3 power system creates less ripple, when rectified, and the nominal (permit voltage) of 400 V ensures that, when the tandem synchronous generator (44) is running at 50% speed, the rectifier bridge (42) can still output 270 VDC, since the full wave rectification of three-phase 200 V, line-to-line, power yields 270 VDC.

Figure 4:
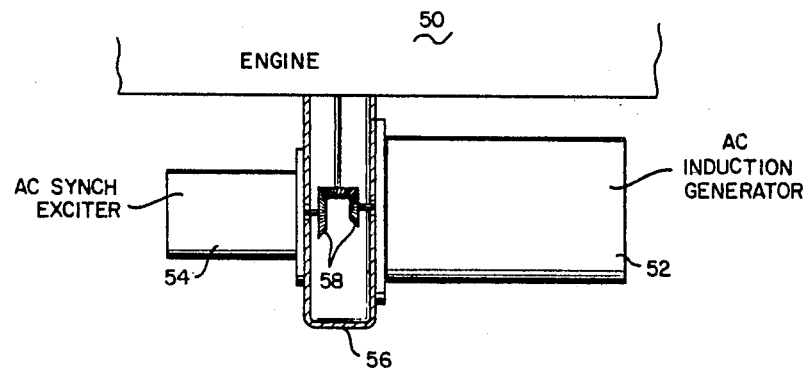
FIG. 4 is a schematic representation of a second embodiment of the present invention, showing the synchronous generator separated from the induction generator by a sandwich gearbox.

It is, of course, possible to separate the induction generator from the synchronous permanent magnet generator and still have an overall combination power system. In essence, the conveniences associated with the drive and single housing arrangement of FIGS. 1-3 would be eliminated with such an arrangement, however. Such a system is schematically represented in FIG. 4, wherein an engine (50) is depicted driving an induction generator (52) and a synchronous permanent magnet exciter generator (54) via a sandwich gearbox arrangement (56). As discussed hereinabove, the bevel gears (58) are provided in a predetermined size and/or pitch to drive the induction generator (52) at a desired faster speed than the exciter generator (54).

Figure 5:
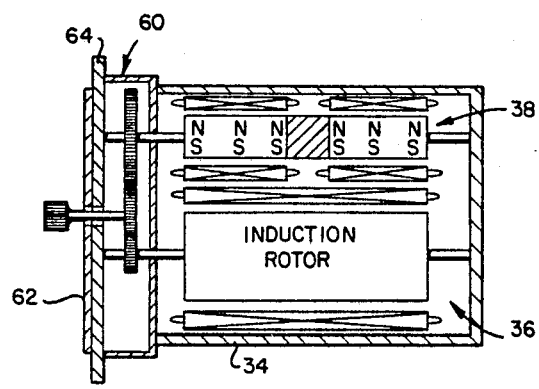
FIG. 5 is a schematic top view of a combination synchronous generator/induction generator power system similar to FIG. 1, but showing a gearbox interposed at the pilot ring end of the generator system.

The FIG. 5 embodiment of the present invention is similar to that depicted in FIG. 1, with the exception that instead of the spur gear interface being located at the anti-drive end of the power system (10), it is located, (in the form of a gearbox (60)) at the pilot ring (62) end of the power unit. The relative speed control of the induction generator (36) and the synchronous permanent magnet tandem generator (38) is, of course, the same. Other modifications in the arrangement of the combination induction generator/synchronous generator power system of the present invention should be readily obvious to a skilled artisan in light of the instant disclosure.

From the foregoing it should be evident that the three unit generator combination of the present invention takes advantage of several areas of modern technology; e.g., samarium-cobalt, high-speed, and semi-conductor technology.

The various figures of the instant disclosure show the induction generator as the large machine. Such a generator may be rated as high as 200 kva and be capable of being used as a starter for large jet and fan-jet engines. In such a start-mode, the generator/(motor) would be supplied with variable-voltage/variable-frequency power, in which the desired voltage/frequency ratio is programmed. However, the generator capacities could be reversed, if desired, inasmuch as the induction generator could be replaced by a large synchronous machine and the induction-generator could be the lower capacity machine. In such a design, the large synchronous generator would be in the larger tunnel area (32) of FIG. 1, and the induction squirrel-cage rotor and permanent magnet rotor would be in the smaller tunnel area (32). This latter type of system might be used where there are a large number of induction motors in the system being powered which would demand large amounts of reactive-kilovars.

The combination generator power system of the present invention offers several advantages, the primary ones being as follows:

1. The system comprises a completely brushless three generator machine design.

2. The system utilizes a single relatively non-complex drive input.

3. The power unit utilizes a single mounting flange (64).

4. The single housing (34) uses a single cooling and lubrication interface.

5. The power system (10) utilizes a highly rugged/highly reliable induction-generator.

6. The induction-generator cannot furnish high destructive energy currents in the event of external faults.

7. Use of scarce and therefore costly permanent magnet materials such as samarium-cobalt is minimized.

8. The system is adapted to generate 400 V/800 $H_z$ voltage-frequency ratio power for aircraft systems.

9. The small synchronous-generator included in the system can supply aircraft power directly, or it can operate as a generator-exciter for the induction machine to convert it to a generator mode.

10. The induction-generator of the system is ideal for heating, lighting and de-icing loads in aircraft.

11. The simple drive arrangement permits fixed supersynchronous speed to be maintained between the permanent magnet rotor and the induction machine rotor.

12. The induction-generator has no synchronizing problems and can be easily paralleled with any synchronous machines.

13. The machine provides constant 270 VDC over the input speed range.

It is apparent that there has been provided with this invention a novel induction-generator/dual samarium-cobalt generator combination which fully satisfy the objects, means and advantages set forth herein before. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

INDUSTRIAL APPLICATION

The induction generator/dual samarium-cobalt generator combination of the present invention is useful for use in aircraft environments to provide both constant voltage 270 VDC, 400 V/800 $H_z$, and variable voltage/variable frequency power to the aircraft's systems, and to provide for engine starting by the induction generator.

I claim:

1. A power generation system comprising in combination:
    an induction machine, said induction machine including an induction rotor mounted on a first shaft; and
    means connected to said induction machine for exciting said induction machine to operate in a generating mode, said exciting means comprises a tandem synchronous generator including first and second synchronous permanent magnet generators, each said first and second synchronous permanent magnet generators having a permanent magnet rotor mounted on a second shaft.

2. A power generation system as in claim 1 wherein said permanent magnet generator rotor is constructed of samarium-cobalt.

3. A power generation system as in claim 1 including mechanical drive means for simultaneously driving both said induction machine rotor and said permanent magnet generator rotor.

4. A power generation system as in claim 3 wherein said mechanical drive means includes at least one gear driven by an engine and at least one gear attached to each of said first and second shafts, said gears interacting and having gear ratios and pitches so as to drive said induction machine rotor at a greater speed relative to said permanent magnet generator rotor, whereby said induction machine is driven above its synchronous speed and operates in a generating mode.

5. A power generation system as in claim 4 including a housing, said induction machine and permanent magnet generator being enclosed within said housing.

6. A power generation system as in claim 5 wherein said housing includes a mounting flange at one end, the other end comprising an anti-drive end, said mechanical drive means being arranged at said anti-drive end of said housing.

7. A power generation system as in claim 5 wherein said housing includes a mounting flange at one end, said mechanical drive means being arranged between said mounting flange and said induction machine and permanent magnet generator.

8. A power generation system is in claim 1 wherein said first synchronous permanent magnet generator is arranged so as to excite said induction machine and said second synchronous permanent magnet generator is arranged so as to generate direct output power for designated loads.

9. A power generation system as in claim 8 including contactor means to disconnect said first synchronous permanent magnet generator from said induction machine, whereby said first synchronous permanent magnet generator generates direct output power for designated loads.

10. A power generation system as in claim 8, or 9 including a bridge rectifier connected to said second synchronous permanent magnet generator whereby 270 VDC power is generated by said second synchronous permanent magnet generator for said designated loads.

11. A power generation system as in claim 10 wherein said generation system, including said bridge rectifier, is located within a single housing.

12. A power generation system as in any one of claims 1, 4, 8 or 9 wherein said system is arranged within a single housing.

13. A power generation system as in claim 1 wherein said induction machine is a squirrel-cage induction generator.

14. An aircraft electric power system comprising:
an aircraft engine;
an induction machine, said induction machine including an induction rotor mounted on a first shaft;
a synchronous permanent magnet generator electrically attached to said induction machine for exciting said induction machine and causing it to operate in a generating mode, said permanent magnet generator comprising a tandem synchronous generator including first and second synchronous permanent magnet generators, each said first and second synchronous permanent magnet generators having a permanent magnet rotor mounted on a second shaft; and
mechanical drive means driven by said engine, said drive means including first and second gear elements secured to said first and second shafts, respectively, whereby said induction machine rotor is driven at a greater speed relative to said permanent magnet generator rotors and said induction machine is driven above its synchronous speed.

15. An aircraft electric power system as in claim 14 wherein said permanent magnet rotor is constructed of samarium-cobalt.

16. An aircraft electric power system as in claim 14 wherein said first synchronous permanent magnet generator is arranged so as to generate direct output power for designated aircraft system loads.

17. An aircraft electric power system as in claim 16 including contactor means to disconnect said first synchronous permanent magnet generator from said induction machine, whereby said first synchronous permanent magnet generator generates direct output power for predetermined aircraft loads.

18. An aircraft electric power system as in claim 16, or 17 including a bridge rectifier connected to said second synchronous permanent magnet generator, whereby 270 VDC power is generated by said second synchronous permanent magnet generator for said designated aircraft system loads.

19. An aircraft electric power system as in claim 18 wherein said induction machine, synchronous permanent magnet generator, and mechanical drive means are located within a single housing.

20. An aircraft electric power system as in any one of claims 14, 16 or 17 wherein said induction machine, synchronous permanent magnet generator, and mechanical drive means are located within a single housing.

21. An aircraft electric power system as in claim 20 wherein said housing is provided with a set of parts for the introduction of coolant and lubrication fluids.

22. A power generation system for providing a variable-frequency/variable-voltage power comprising in combination:
a drive shaft adapted to be rotated at a variable speed by a source of mechanical power;
a synchronous generator having a synchronous rotor mechanically coupled to said drive shaft so as to rotate therewith in a first predetermined rotational relationship and also having a synchronous stator connected to a first set of electrical terminals, the output of said synchronous generator at said first set of terminals having a variable frequency characteristic in accordance with said variable speed of said drive shaft and said first rotational relationship;
an induction generator having an induction rotor mechanically coupled to said drive shaft to rotate therewith in a second predetermined rotational relationship and also having an induction stator connected to a second set of electrical terminals, the output of said induction generator having a variable voltage characteristic in accordance with said variable speed of said drive shaft and said second rotational relationship, a frequency characteristic determined by the frequency characteristic of an excitation input applied to said second set of terminals, and a power characteristic determined by the percentage difference between said excitation input frequency characteristic and a synchronous frequency, said synchronous frequency being directly related to the rotational speed of said induction rotor; and means for effecting respective direct electrical connections between respective ones of said first and second sets of terminals so that said output of said synchronous generator will serve as said excitation input for said induction generator and the output of said induction generator will thereby have a variable frequency characteristic in accordance with said variable rotational speed of said drive shaft and said first rotational relationship.

23. A power generation system as in claim 22 wherein said first predetermined rotational relationship and said second predetermined rotational relationship are each fixed but different, whereby said excitation input frequency characteristic associated with the rotation of said synchronous rotor bears a fixed percentage relationship to said synchronous frequency associated with the rotation of said induction rotor, and whereby said induction generator power characteristic remains essentially constant over a range of speeds of said drive shaft.

24. A power generation system as in claim 23 wherein said synchronous rotor is arranged to run at a lower rotational speed than that of said induction rotor.

25. A power generation system as in claim 22 wherein at least one of said first and second predetermined rotational relationships is established by means of a mechanical transmission having an input shaft rotating at a different speed than that of an output shaft.

26. The power generation system of claim 25 wherein said mechanical transmission includes a pair of mating gears.

27. A power generation system as in claim 22 wherein said first and second predetermined rotational relationships are established by means of a mechanical transmission including a driving gear attached to said drive shaft, a synchronous gear attached to said synchronous rotor and a induction gear attached to said induction rotor, said gears interacting and having gear ratios and pitches so as to drive said induction rotor at a greater speed than that of said synchronous rotor.

28. A power generation system as in claim 22 wherein said synchronous rotor is constructed at least in part of a permanent magnet material.

29. A power generation system as in claim 28 wherein said permanent magnet material is samarium-cobalt.

30. A power generation system as in claim 22 further including a housing, said induction generator and said synchronous generator being enclosed within said housing.

31. A power generation system as in claim 30 wherein said housing is provided with a means for introducing coolant and lubrication fluids.

32. A power generation system as in claim 22 wherein said induction rotor is a squirrel-cage induction rotor said induction stator is a three-phase stator.

* * * * *